(12) United States Patent
Hamada et al.

(10) Patent No.: US 8,167,750 B2
(45) Date of Patent: May 1, 2012

(54) RESIN PULLEY

(75) Inventors: Kazuki Hamada, Kashiwara (JP);
Hiroshi Ueno, Tondabayashi (JP);
Kunio Yanai, Katsuragi (JP); Masanori Shinohara, Kashiwara (JP); Tomoki Uno, Kashiwara (JP)

(73) Assignee: JTEKT Corporation, Osaka-Shi, Osaka (JP)

(*) Notice: Subject to any disclaimer, the term of this patent is extended or adjusted under 35 U.S.C. 154(b) by 441 days.

(21) Appl. No.: 12/318,728

(22) Filed: Jan. 7, 2009

(65) Prior Publication Data

US 2009/0191995 A1   Jul. 30, 2009

(30) Foreign Application Priority Data

Jan. 24, 2008   (JP) ................. 2008-013942

(51) Int. Cl.
*F16H 7/20*   (2006.01)
(52) U.S. Cl. ............. 474/199; 474/188; 474/195
(58) Field of Classification Search ........... 474/161, 474/188, 195, 199
See application file for complete search history.

(56) References Cited

U.S. PATENT DOCUMENTS

| | | | | |
|---|---|---|---|---|
| 4,668,209 A | * | 5/1987 | Kyoosei et al. ........... | 474/190 |
| 5,630,769 A | * | 5/1997 | Schmidt et al. ........... | 474/167 |
| 7,695,385 B2 | * | 4/2010 | Barraud et al. ........... | 474/199 |
| 2006/0160647 A1 | * | 7/2006 | Swane ..................... | 474/166 |
| 2007/0232427 A1 | * | 10/2007 | Ueno et al. ............... | 474/199 |
| 2008/0219607 A1 | * | 9/2008 | Murao ..................... | 384/417 |

FOREIGN PATENT DOCUMENTS

| | | |
|---|---|---|
| JP | 53-56602 | 5/1978 |
| JP | 54-167256 | 11/1979 |
| JP | 4-106550 | 9/1992 |
| JP | 4-106551 | 9/1992 |
| JP | 7-63249 | 3/1995 |
| JP | 7-34253 | 6/1995 |
| JP | 2001-336613 A | 12/2001 |
| JP | 2002-303365 (A) | 10/2002 |
| JP | 2004-239382 | 8/2004 |
| JP | 2004-239382 A | 8/2004 |
| JP | 2006-316974 A | 11/2006 |
| JP | 2007-263294 | 10/2007 |

OTHER PUBLICATIONS

European Search Report dated Mar. 18, 2009.
Notification of Reason for Refusal dated Feb. 14, 2012, with English translation.

* cited by examiner

*Primary Examiner* — Sang Kim
(74) *Attorney, Agent, or Firm* — McGinn IP Law Group, PLLC (57) ABSTRACT

A resin pulley includes: an outer cylindrical portion having an outer circumferential surface on which a belt is to be wound; an inner cylindrical portion which is disposed radially inwards of and concentrically with the outer cylindrical portion; and a plurality of ribs connecting an inner circumferential surface of the outer cylindrical portion and an outer circumferential surface of the inner cylindrical portion. The outer cylindrical portion, the inner cylindrical portion and the ribs are formed integrally from a resin material, and the ribs are provided in such a manner as to be inclined towards a circumferential direction relative to a radial imaginary line as viewed in an axial direction.

12 Claims, 9 Drawing Sheets

RESIN PULLEY

BACKGROUND OF THE INVENTION

The present invention relates to a resin pulley which is used as an idler pulley for guiding a belt in a belt transmission system between a crankshaft and an auxiliary in, for example, a motor vehicle engine.

In a motor vehicle, an idler pulley for guiding a belt is provided in a belt transmission system which transmits rotational power of an engine to an auxiliary such as an alternator. In recent years, a resin pulley is used for such an idler pulley for reduction in weight and costs (for example, refer to JP-A-7-63249).

Figure 9A:
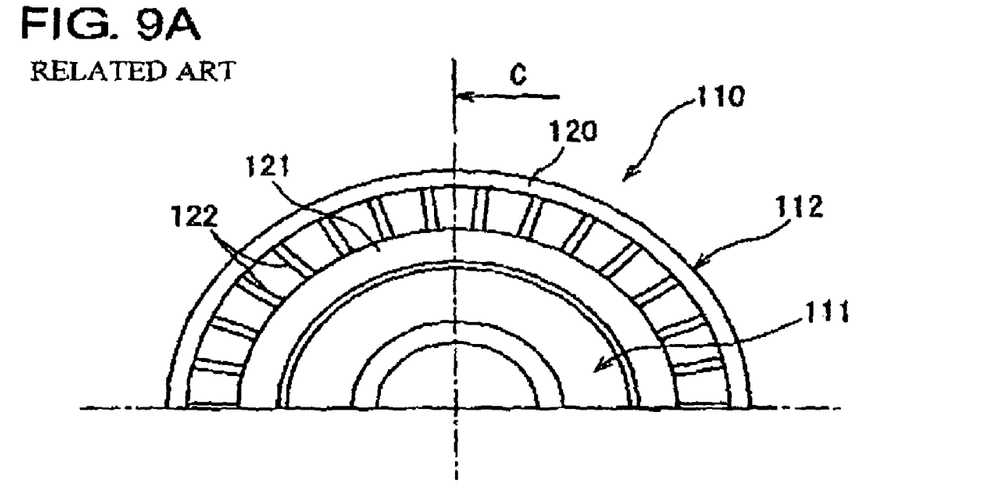
FIG. 9A is a side view of an upper half of the resin pulley according to the related art and FIG. 9B is a sectional view taken along the line C-C and as viewed in a direction indicated by arrows C at FIG. 9A.
Figure 9B:
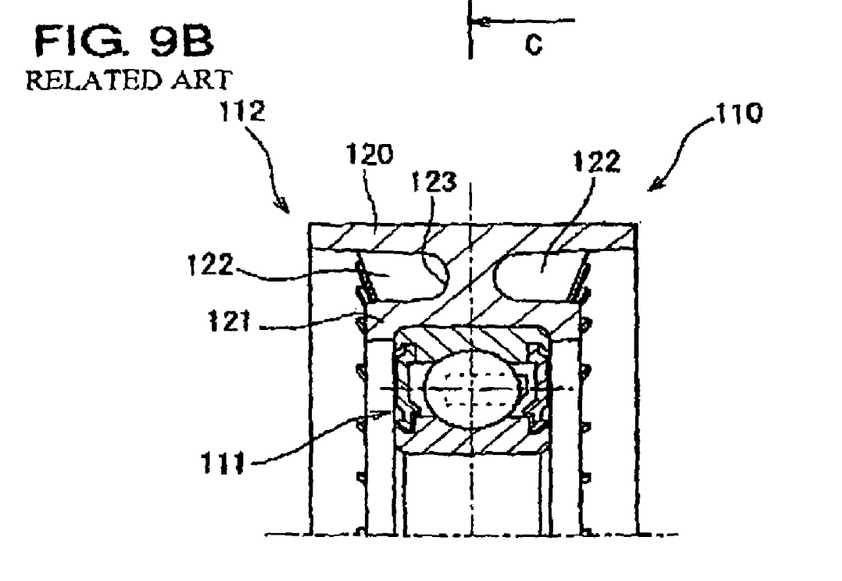

FIG. 9A is a side view showing an upper half of a conventional resin pulley, and FIG. 9B is a sectional view taken along the line C-C and as viewed in a direction indicated by arrows C in FIG. 9A. A conventional resin pulley 110 includes an outer cylindrical portion 120 round an outer circumferential surface of which a transmission belt is wound, an inner cylindrical portion which is disposed radially inwards of and concentrically with the outer cylindrical portion and on an inner circumferential surface of which a rolling bearing 111 is mounted, a circular disk portion 123 which connects together the inner cylindrical portion 121 and the outer cylindrical portion 120 at an axial center between the inner cylindrical portion 121 and the outer cylindrical portion 120, a plurality of ribs 122 which connect together the inner cylindrical portion 121 and the outer cylindrical portion 120 on both axial sides of the circular disk portion 123. The outer cylindrical portion 120, the inner cylindrical portion 121, the circular disk portion 123 and the ribs 122 are molded integrally with a rolling bearing 11 inserted therein through injection molding.

In the resin pulley 110 shown in FIGS. 9A and 9B, since the ribs 122 are formed radially in such a manner as to be directed in radial directions, the ribs 22 are in such a state that they project vertically relative to the outer cylindrical portion 120. Because of this, unevenness tends to be easily produced on the outer circumferential surface of the outer cylindrical portion 120 between portions where the ribs 22 are formed and portions spanning between the ribs during injection molding, this deteriorating the roundness of the resin pulley. Since the belt is wound round the outer circumferential surface of the outer cylindrical portion 120, the deterioration in roundness of the outer circumferential surface constitutes a cause for generation of noise and/or reduction in durability of the belt.

In addition, the deterioration in roundness of the resin pulley tends to take place easily when the resin pulley is molded from a thermal plastic resin such as nylon, and there occurs almost no such deterioration in roundness when the resin pulley is molded from a thermosetting resin such as a phenol resin having high dimensional stability. However, since thermosetting resins have a drawback that they are difficult to be recycled, thermoplastic resins are preferably used to mold resin pulleys while increasing roundness from the viewpoint of conservation of environment.

On the other hand, in the resin pulley 110 shown in FIGS. 9A and 9B, since the ribs 122 and the circular disk portion 123 are in such a state that they project vertically relative to the outer cylindrical portion 120, when a load is exerted on the outer cylindrical portion 120 from the belt, stress tends to be concentrated on the outer cylindrical portion 120 in the vicinity of joining portions where the ribs 122 and the circular disk portion 123 are joined to the outer cylindrical portion 120. In addition, since impact and vibration from the belt are transmitted from the outer cylindrical portion 120 to the inner cylindrical portion 121 via the ribs 122 substantially without being dampened, the rolling bearing 111 will have to be subjected to large impact and vibration. Because of this, there tends to be generated damage or wear such as a white layer flaking in the rolling bearing 111, leading to the possibility that the life of the rolling bearing 111 is reduced.

In addition, since the circular disk portion 123 is formed on the resin pulley 110 shown in FIGS. 9A and 9B, an axial air flow moving towards the resin pulley 110 is cut off by the circular disk portion 123 so formed. Because of this, the heat dissipating properties of the resin pulley are reduced, and hence, grease poured into the rolling bearing 111 tends to be thermally affected to thereby be deteriorated in quality or performance.

SUMMARY OF THE INVENTION

The invention has been made in view of the situations described above, and an object thereof is to increase the roundness of the outer circumferential surface of the resin pulley.

According to an aspect of the invention, there is provided a resin pulley including an outer cylindrical portion round an outer circumferential surface of which a belt is wound, an inner cylindrical portion which is disposed radially inwards of and concentrically with the outer cylindrical portion, and a plurality of ribs connecting an inner circumferential surface of the outer cylindrical portion and an outer circumferential surface of the inner cylindrical portion, the outer cylindrical portion, the inner cylindrical portion and the ribs being formed integrally from a resin material, wherein the ribs are provided in such a manner as to be inclined towards a circumferential direction relative to a radial imaginary line as viewed in an axial direction.

According to the configuration described above, since the ribs are provided in such a manner as to be inclined in the circumferential direction relative to the radial imaginary line, the ribs are not in such a state that they project vertically relative to the outer cylindrical portion as with the related art (refer to FIG. 9), and hence, unevenness is made difficult to be produced on the outer circumferential surface of the outer cylindrical portion during injection molding. Consequently, the roundness of the outer cylindrical portion can be increased.

In addition, since the ribs are inclined in the circumferential direction relative to the radial imaginary line, when the load from the belt is exerted on the outer cylindrical portion, stress is made difficult to be concentrated on the outer cylindrical portion at the joining portions where the ribs are joined to the outer cylindrical portion, whereby the stress can be dispersed. Further, the ribs tend to be deflected by impact and vibration transmitted from the belt, whereby the impact and vibration so transmitted can be absorbed by the ribs. Because of this, the failure of the resin pulley can be prevented and the durability thereof can be increased. In addition, in the case of a rolling bearing being mounted in the inner cylindrical portion of the resin pulley, the durability of the rolling bearing can also be increased.

Hollow hole portions are preferably formed between the ribs which lie adjacent in the circumferential direction in such a manner as to penetrate through the resin pulley in an axial direction thereof. The heat dissipating properties of the resin pulley can be increased. Consequently, in the case of a rolling bearing is mounted in the resin pulley, a lubricant supplied to the rolling bearing is prevented from being deteriorated by heat, thereby making it possible to extend the life of the lubricant. In addition, by the hollow hole portions being formed, the cushioning properties of the resin pulley by the ribs are increased further, thereby making it possible to increase the impact and vibration absorbing function of the resin pulley.

The ribs which lie adjacent in the circumferential direction are preferably disposed in such a manner as to be inclined towards opposite directions to each other.

In addition, radially outer end portions of the ribs are preferably formed in such a manner that their inclination angle relative to the radial imaginary line increases further as they extend radially outwards, and radially inner end portions of the ribs are preferably formed in such a manner that their inclination angle relative to the radial imaginary line increases further as they extend radially inwards. By these configurations, the stress dispersing function and impact and vibration absorbing function of the resin pulley can be increased further.

In the resin pulley of the invention, a plurality of rib rows are preferably provided in the axial direction, each row of ribs containing a plurality of ribs which are aligned in the circumferential direction, the plurality of rib rows preferably has the same external shape as viewed in the axial direction, and at least the rib rows which lie adjacent in the axial direction are preferably disposed in such a manner that their phases are offset from each other in the circumferential direction. In this case, a circumferential pitch of the ribs which contact the outer cylindrical portion can substantially be shortened, whereby the roundness of the outer circumferential surface of the outer cylindrical portion can be increased further.

According to the invention, the roundness of the outer circumferential surface of the resin pulley can be increased.

DETAILED DESCRIPTION OF PREFERRED EMBODIMENTS

Figure 1:
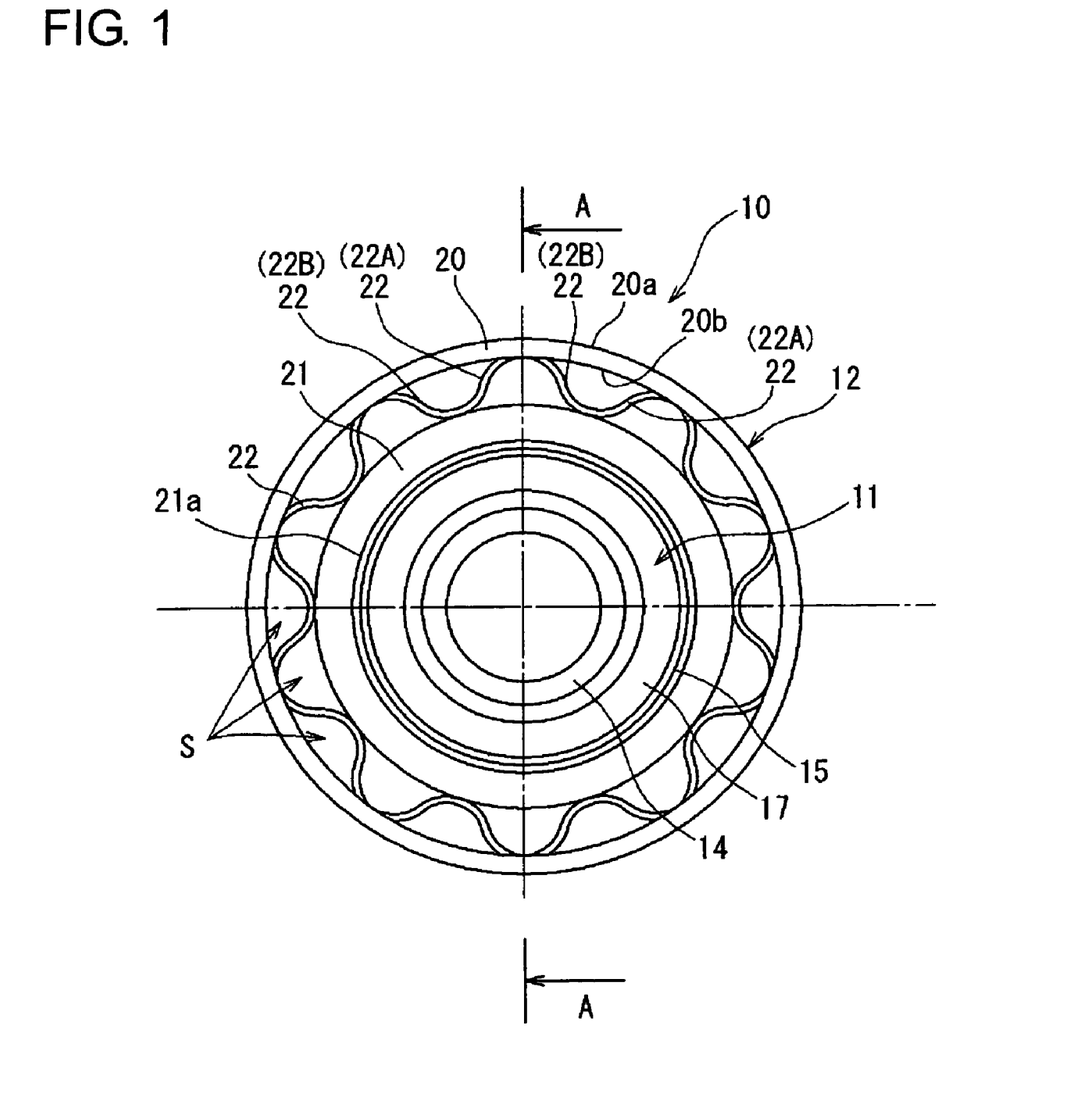
FIG. 1 is a side view of a resin pulley according to a first embodiment of the invention.
Figure 2:
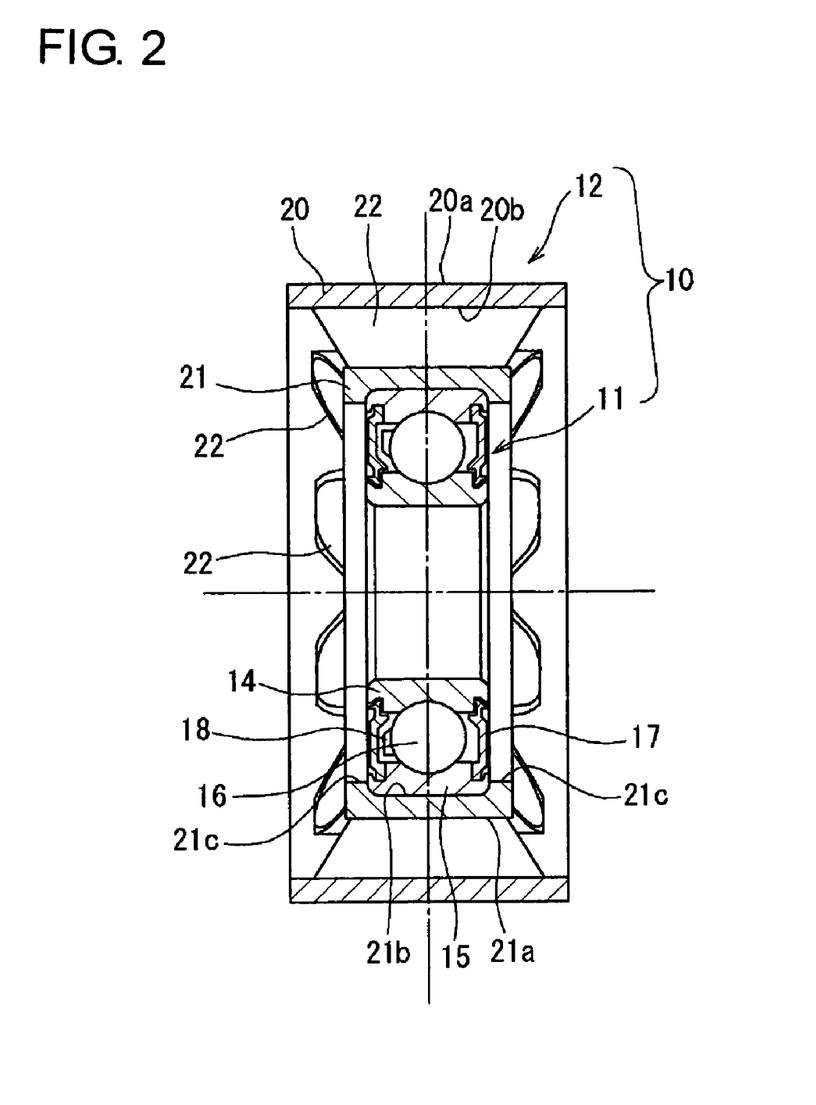
FIG. 2 is a sectional view taken along the line A-A and as viewed in a direction indicated by arrows A in FIG. 1.

FIG. 1 is a side view of a resin pulley according to a first embodiment of the invention, and FIG. 2 is a sectional view taken along the line A-A and as viewed in a direction indicated by arrows A in FIG. 1. A resin pulley 10 is made up of a rolling bearing 11 and a pulley main body 12. The rolling bearing 11 includes an inner ring 14, an outer ring 15, a plurality of balls (rolling elements) 16 which are disposed rollingly between the inner ring 14 and the outer ring 15, a cage 18 which holds the plurality of balls 16, and seal members 17 which seal tightly a space portion between the inner ring 14 and the outer ring 15. A shaft, not shown, is fitted in an inner circumferential surface of the inner ring 14, and this shaft and the pulley main body 12 are made to rotate relatively via the rolling bearing 11.

The pulley main body 12 is mounted on an outer circumferential surface of the outer ring 15. The pulley main body 12 includes an inner cylindrical portion 21 whose inner circumferential surface 21b is fitted on an outer circumferential surface of the outer ring 15, an outer cylindrical portion 20 which is disposed concentrically with the inner cylindrical portion 21, and a plurality of ribs (connecting ribs) 22 which are provided between the inner cylindrical portion 21 and the outer cylindrical portion 20 for connecting both the cylindrical portions together. The inner cylindrical portion 21, the outer cylindrical portion 20 and the ribs 22 are formed integrally through injection molding with the rocking bearing 11 inserted therein. A thermoplastic resin such as nylon is used as a material for the pulley main body 12, and the pulley main body 12 is molded from a material in which reinforced fibers such as glass fibers or an additives such as elastomer is added to the thermoplastic material. Alternatively, the pulley main body 12 can, of course, be molded from a material in which reinforced fibers or an additive is added to a thermosetting resin such as a phenol resin.

Elongated projections 21c are formed on both axial sides of the inner circumferential surface 21b of the inner cylindrical portion 21 along the full circumference thereof in such a manner as to project radially inwards, and the outer ring 15 is fitted between the elongated projections 21c formed on both the axial sides. A belt, not shown, is wound round an outer circumferential surface 20a of the outer cylindrical portion 20, and by the belt being made to run in a rotating fashion, the pulley main body 12 rotates.

Figure 3:
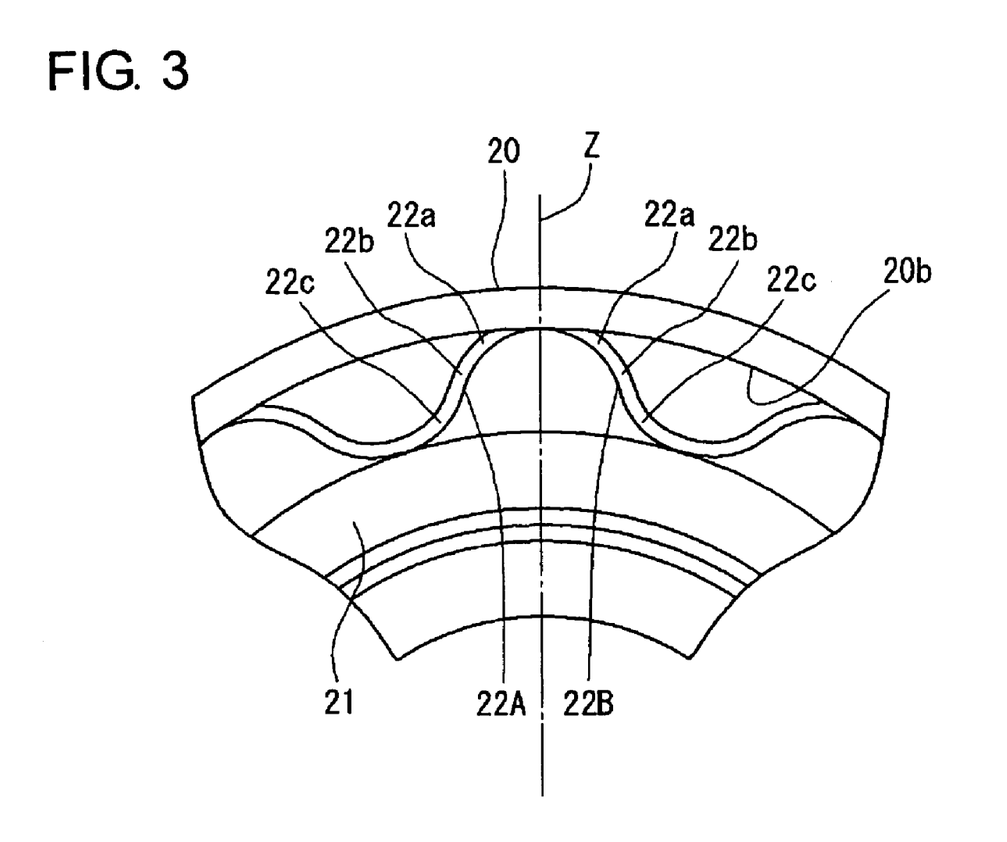
FIG. 3 is an enlarged side view of a main part of the resin pulley shown in FIG. 1.

As is shown in FIG. 1, the plurality of ribs 22 are disposed in a zigzag fashion as viewed from the side (as viewed in an axial direction). Specifically, as is shown in FIG. 3, each rib 22 is made up of a first rib 22A which is inclined in one circumferential direction relative to an imaginary line Z (hereinafter, referred to as a "radial line Z") which extends radially and a second rib 22B which is inclined in the other circumferential direction, and the first and second ribs 22A, 22B are disposed alternately in the circumferential direction.

In addition, the plurality of ribs 22 are formed into a waveform-like shape resembling a sine wave as a whole as viewed from the side. In each rib 22, a radially outer end portion 22a and a radially inner end portion 22c are formed into an arc-like shape, and an intermediate portion 22b lying between both the end portions 22a, 22c is formed into a straight line or an arc-like shape which is more moderate in curvature than both the end portions 22a, 22c.

Consequently, the inclination angle of the radially outer end portion 22a of each rib 22 becomes larger relative to the radial line Z as it extends radially outwards further, and the inclination angle of the radially inner end portion 22c of each rib 22 becomes larger relative to the radial line Z as it extends radially inwards further.

In first and second ribs 22A, 22B which lie adjacent to each other in the circumferential direction, radially inner end portions 22c are directly connected to each other. In addition, in first and second ribs 22A, 22B which lie adjacent to each other in the circumferential direction, radially outer end portions 22a are connected to each other via the outer cylindrical portion 20, and inner circumferential surfaces of the respective radially outer end portions 22a continuously connect to the inner circumferential surface 20b of the outer cylindrical portion 20 in a smooth fashion. In addition, the radially outer end portions 22a of the first and second ribs 22A, 22B may be directly connected to each other, and the radially inner end portions 22c of the first and second ribs 22A, 22B may be connected to each other via the inner cylindrical end portion 21.

As is shown in FIG. 1, the outer cylindrical portion 20 and the inner cylindrical portion 21 are connected to each other only by the ribs 22, and hollow hole portions S are formed between the first and second ribs 22A, 22B which lie adjacent in the circumferential direction in such a manner as to penetrate through the pulley main body 12 in the axial direction thereof.

In the configuration that has been described above, since the pulley main body 12 includes the plurality of ribs 22 between the outer cylindrical portion 20 and the inner cylindrical portion 21 and the ribs 22 are inclined in the circumferential direction relative to the radial line Z (refer to FIG. 3), the ribs 22 are not in such a state as occurring with the related art resin pulley shown in FIGS. 9A and 9B in which the ribs 122 project vertically relative to the outer cylindrical portion 120. Because of this, at the time of injection molding, unevenness is made difficult to take place on the outer circumferential surface of the outer cylindrical portion 20 between the portions where the ribs are formed and the portions spanning between the ribs, whereby the roundness is increased further compared with the conventional resin pulley.

In addition, since the ribs 22 are inclined in the circumferential direction relative to the radial line Z, when a load from the belt is given to the outer cylindrical portion 20, stress is made difficult to be concentrated on the outer cylindrical portion 20 at the joining portions where the ribs 22 are joined to the outer cylindrical portion 20 and is dispersed. Further, since the ribs 22 are made to be deflected easily in the radial direction by impact and vibration transmitted from the belt, the elastic force (the cushioning properties) of the ribs 22 is increased, whereby the impact and vibration can preferably be absorbed by the ribs. Because of this, the failure of the pulley main body 12 and the rolling bearing 11 can be prevented, so as to increase the durability thereof.

In addition, as is shown in FIG. 3, since the rib 22 is formed in such a manner that the radially outer end portion 22a is formed into the arc-like shape and that the inclination angle of the radially outer end portion 22a becomes so large as it extends radially outwards that the radially outer end portion 22a extends along the outer cylindrical portion 20, the aforesaid stress dispersing function and impact and vibration absorbing function can be increased further.

Since the hollow hole portions S are formed in the pulley main body 12 in such a manner as to penetrate therethrough in the axial direction, the heat dissipating properties of the pulley main body 12 can be increased. Because of this, grease sealed in the rolling bearing 11 can be prevented from being deteriorated by heat, thereby making it possible to extend the life of the grease. In addition, since the hollow hole portions S are so formed, the cushioning properties by the ribs 22 can be increased further. Additionally, since the pulley main body 12 includes no such circular disk portion 123 as is shown in FIGS. 9A and 9B, a reduction in weight of the pulley main body 12 can be realized.

The pulley main body 12 of the embodiment is molded from a material in which an elastomer such as rubber is added as an additive to a thermoplastic resin. Because of this, the material of the pulley main body 12 has elasticity (spring properties) by itself and hence, the impact and vibration absorbing function of the pulley main body 12 is increased. For example, in the event that an impact is imparted to both a pulley main body molded from a resin material to which no elastomer is added and a pulley main body molded from a resin material to which elastomer is added to such an extent that they come to fracture, when compared with the former, the latter takes a relatively long time to fracture. Because of this, the latter can maintain the belt guiding function long although the fracture progresses. In addition, in the case of the latter pulley main body, since abnormality such as abnormal noise is generated as the fracture progresses, the operator (in the case of a motor vehicle, the driver) can recognize that the resin pulley is fracturing before the resin pulley fails to function properly.

Figure 4:
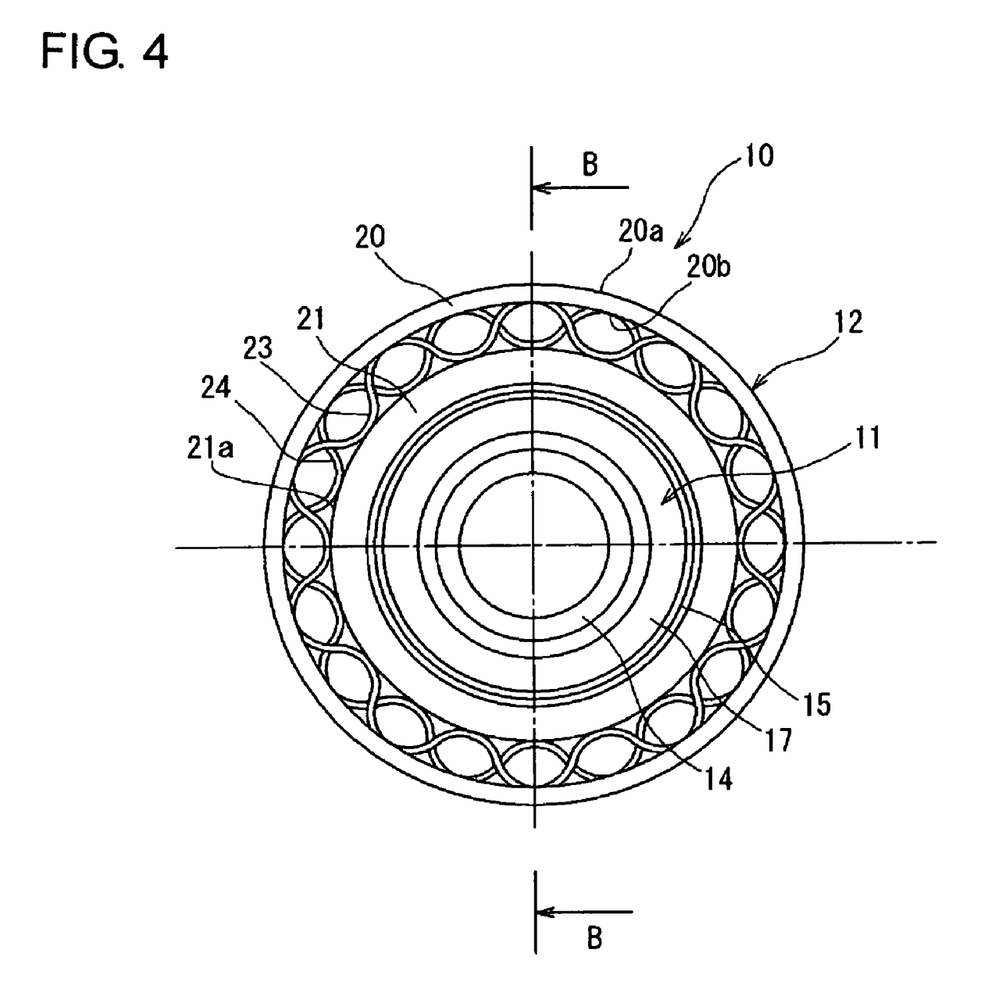
FIG. 4 is a side view of a resin pulley according to a second embodiment of the invention.
Figure 5:
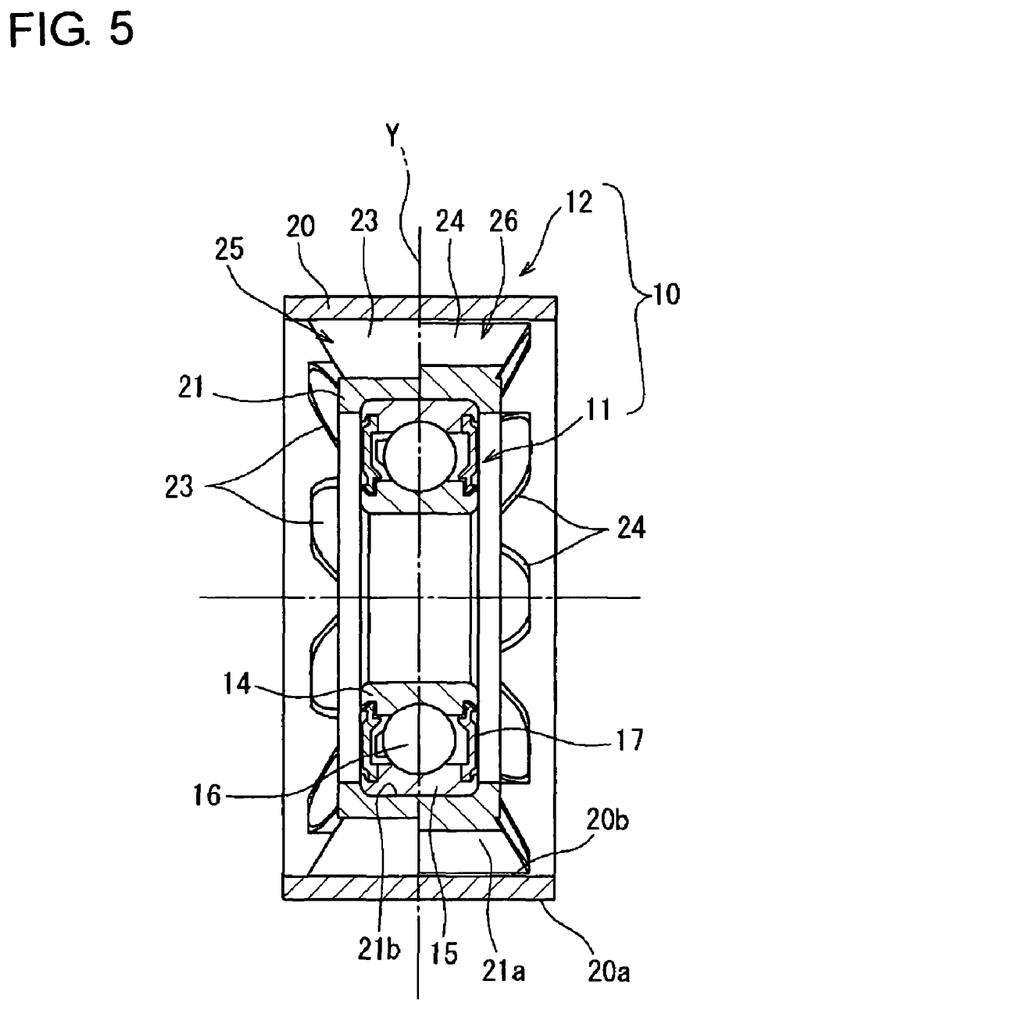
FIG. 5 is a sectional view taken along the line B-B and as viewed in a direction indicated by arrows B in FIG. 4.

FIG. 4 is a side view of a resin pulley according to a second embodiment of the invention, and FIG. 5 is a sectional view taken along the line B-B and as viewed in a direction indicated by arrows B in FIG. 4. A resin pulley 10 of the second embodiment is similar to that of the first embodiment except that the configuration of a plurality of ribs (denoted by reference numerals 23, 24 in this embodiment) differs, and hence, the detailed description of similar features will be omitted here.

As is shown in FIG. 5, a pulley main body 12 of this embodiment includes a first rib row 25 and a second rib row 26 which are separated by an axial center Y thereof. The first rib row 25 includes a plurality of ribs 23 which are aligned in a circumferential direction and the second rib row 26 includes a plurality of ribs 24 which are aligned in the circumferential direction. The ribs 23 of the first rib row 25 and the ribs 24 of the second rib row 26 have, as is shown in FIG. 4, the same external shape as viewed from the side and are formed into a waveform-like shape as a whole as with the first embodiment. However, the ribs 23 of the first rib row 25 and the ribs 24 of the second rib row 26 are disposed in such a state that their phases are offset from each other by a half of a wavelength in the circumferential direction.

The second embodiment provides the same function and advantage as those provided by the first embodiment. Furthermore, in this embodiment, since a circumferential pitch of the ribs 23, 24 relative to an outer cylindrical portion 20 becomes substantially small compared with the first embodiment (becomes one half of the pitch of the first embodiment), the roundness of the outer cylindrical portion 20 is increased further. In addition, noise arising in relation to the rotation of the pulley can be reduced due to the circumferential pitch of the ribs 23, 24 being so reduced.

Figure 6A:
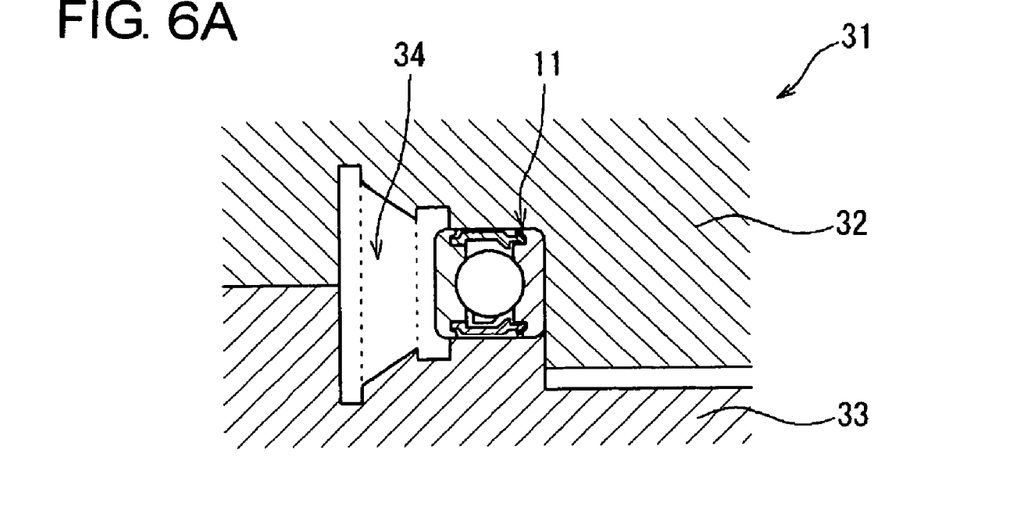
FIGS. 6A and 6B are sectional views of a mold for molding the resin pulleys of the invention.
Figure 6B:
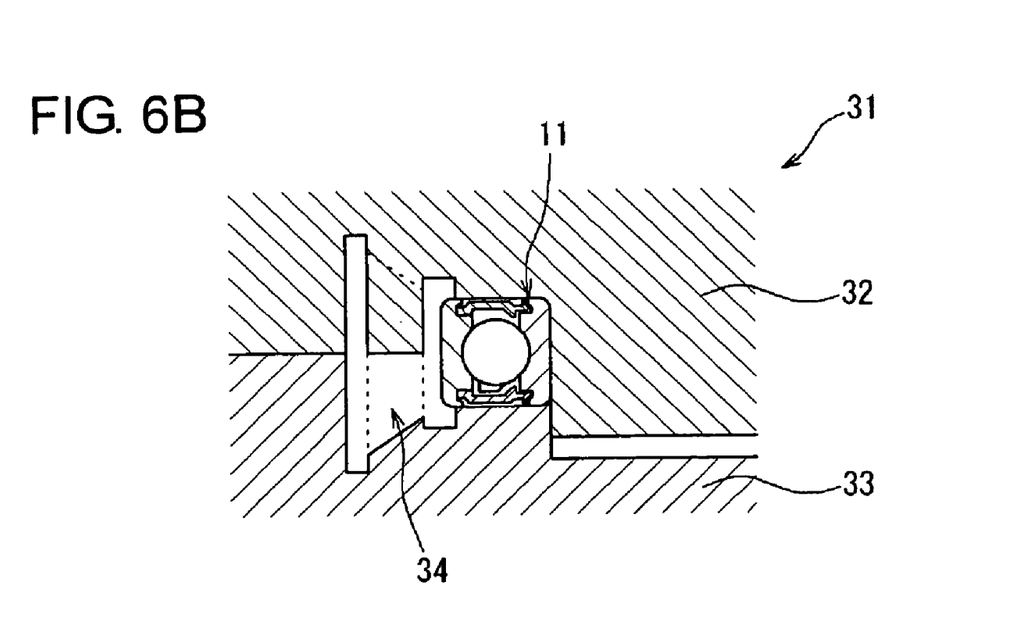

The resin pulleys of the first and second embodiments are molded by the use of a mold 31 shown in FIGS. 6A and 6B. FIG. 6A shows a mold 31 for the resin pulley of the first embodiment, and this mold 31 is made up of an upper mold 32 and a lower mold 33. By the upper mold 32 and the lower mold 33 being superimposed one on the other, a cavity 34 for molding the pulley main body 12 is formed. In addition, the rolling bearing 11 is inserted between the upper mold 32 and the lower mold 33. In addition, in FIGS. 6A and 6B, for the sake of simplicity, the cavity for molding the ribs 22 is shown in such a state that the ribs are not inclined in the circumferential direction but extend along the radial direction.

By the use of the upper mold 32 and the lower mold 33, as is shown in FIG. 2, the single rib row made up of the plurality of ribs 22 is formed between the outer cylindrical portion 20 and the inner cylindrical portion 21.

On the other hand, FIG. 6B shows a mold 31 for molding the resin pulley of the second embodiment and this mold is made up of the same upper mold 32 and lower mold 33 as those shown in FIG. 6A. However, the upper mold 32 and the lower mold 33 are superimposed one on the other in such a state that their phases are offset in the circumferential direction. As a result, as is shown in FIG. 5, the rib row 25 made up of the plurality of ribs 23 and the rib row 26 made up of the plurality of ribs 24 are formed between the outer cylindrical portion 20 and the inner cylindrical portion 21.

In this way, although the resin pulleys of the first and second embodiments are different from each other in arrangement of the ribs 22, 23, 24, the resin pulleys can be molded by the use of the same mold 31, thereby making it possible to reduce the production costs by the use of the common part.

Figure 7A:
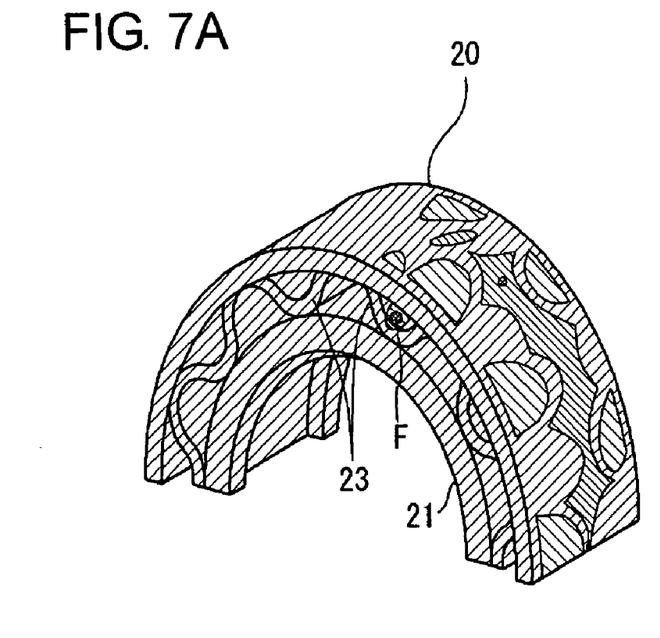
FIGS. 7A and 7B are diagrams illustrating the results of an FEM analysis carried out on the resin pulley according to the second embodiment of the invention, FIG. 7A being a stress distribution diagram, FIG. 7B being a displacement distribution diagram.
Figure 7B:
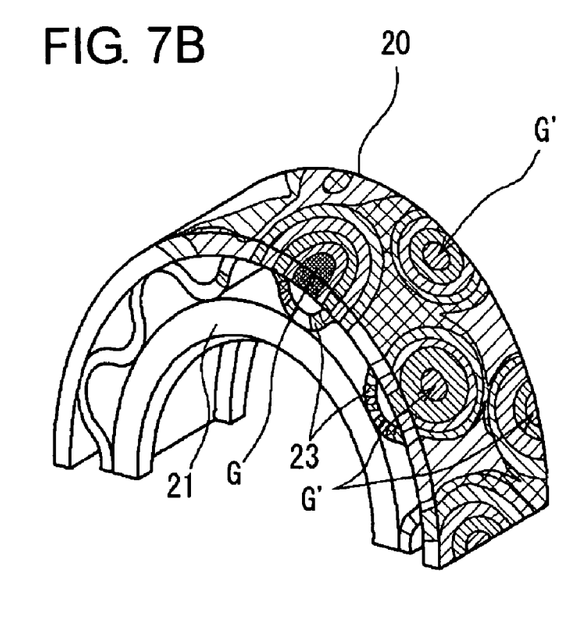
Figure 8A:
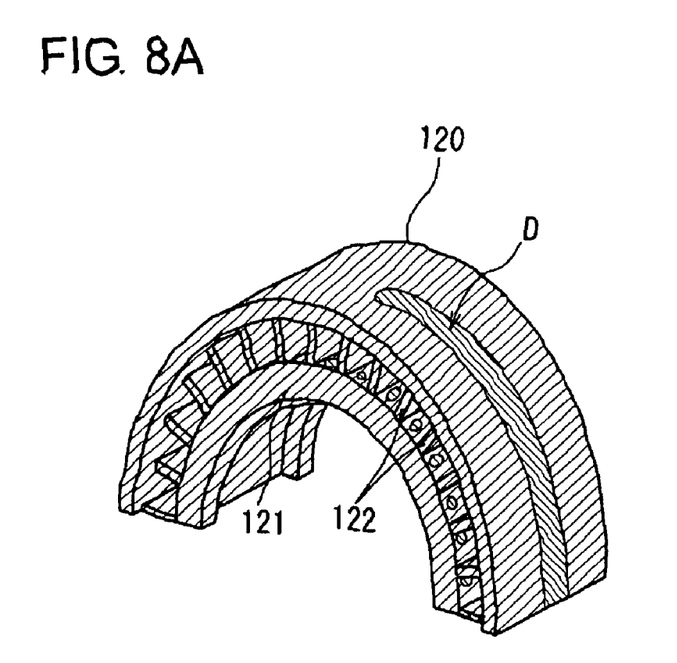
FIGS. 8A and 8B are diagram illustrating the results of an FEM analysis carried out on a related art resin pulley, FIG. 8A being a stress distribution diagram, FIG. 8B being a displacement distribution diagram.
Figure 8B:
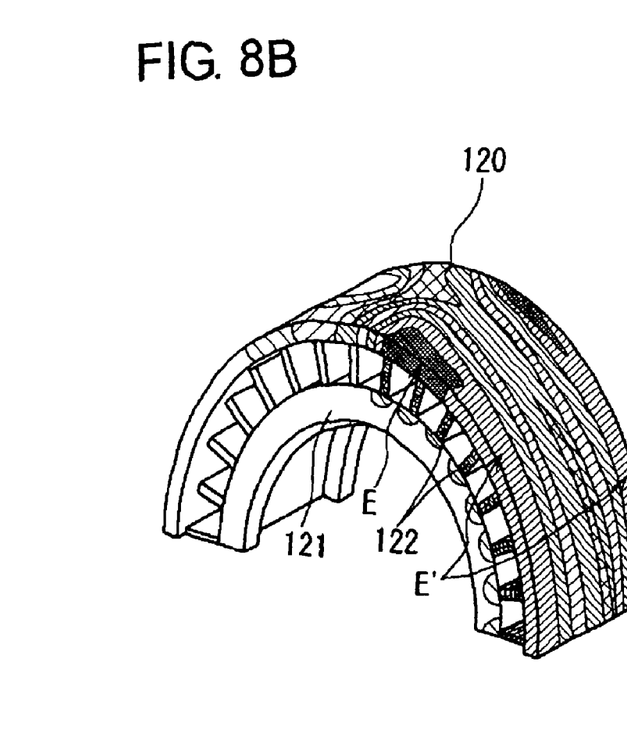

The applicant of this patent application carried out a test in which a load was applied to the resin pulley (refer to FIG. 4) described according to the second embodiment and the related art resin pulley (refer to FIGS. 9A and 9B) under the same conditions and stress and displacement generated in the respective resin pulleys were FEM analyzed. FIGS. 7A and 7B show diagrams illustrating the results of the FEM analysis carried out on the resin pulley of the invention, and FIGS. 8A and 8B show diagrams illustrating the results of the FEM analysis carried out on the related art resin pulley. A diagram of stress distribution is shown at FIGS. 7A and 8A, and a diagram of displacement distribution is shown at FIGS. 7B and 8B. In addition, both the resin pulleys were molded from a material in which 33% of glass fibers was added to nylon 66, a belt having a width of 20 mm was wound round each of the resin pulleys over an angular range of 180°, and a load of 8 kN was applied to both the resin pulleys. In FIGS. 7A to 8,B although only an upper half of the resin pulley is shown, it is understood that the belt was wound round a right half portion of each of the resin pulleys over the angular range of 180°. Consequently, in FIGS. 7A to 8B, a lower half of the belt winding range is omitted. In addition, in FIGS. 7A to 8B, the density of hatching is illustrated as being increased at portions where stress values or displacement values are large.

As shown in FIG. 8A, in the related art resin pulley, a largest main stress was generated over the whole belt winding range at the axial center (a portion denoted by D in FIG. 8A) of the outer cylindrical portion 120 where rigidity became particularly high, that is, on an outer circumferential side of the circular disk portion 123. On the contrary, a largest displacement was found at an end portion (a portion denoted by E in FIG. 8B) of the belt winding range on both axial ends of the outer cylindrical portion 120, and large displacements were found over the whole (portions denoted by E' in FIG. 8B) of the belt winding range.

In contrast to this, in the case of the resin pulley of the invention, a largest main stress was generated at a radially inner end portion (a portion denoted by F in FIG. 7A) of the rib 23 in the vicinity of an end portion of the belt winding range. In addition, a largest displacement was found at a portion (a portion denoted by G in FIG. 7B) corresponding to a portion of the outer cylindrical portion 20 which lies between the ribs 23 in the vicinity of the end portion of the belt winding range. Additionally, in the belt winding range, relatively large displacement were found at portions (portions denoted by G' in FIG. 7B) corresponding to other portions of the outer cylindrical portion 20 which lie between the ribs 23, 24 and at the respective ribs 23, 24. Consequently, in the case of the invention, the largest main stress was not generated in the outer cylindrical portion 20, and the large displacements were found at the portions corresponding to the portions of the outer cylindrical portion 20 which lie between the ribs 23, 24 and at the respective ribs 23, 24. It can be seen from this that impact and vibration can be absorbed in a preferred fashion.

The invention is not limited to the embodiments and hence can be modified in design as required. For example, in the first and second embodiments, although the radially outer end portions and radially inner end portions of the ribs are formed into the arc-like shape, they may be formed into a straight line as with the intermediate portions of the ribs. However, in order to increase the stress dispersing function and the impact and vibration absorbing function further, as in the first and second embodiments, the radially outer end portions and inner end portions are preferably formed into the arc-like shape so that the ribs are each formed into the waveform-like shape as a whole.

In addition, while the second embodiment is described as having the two rib rows which are provided in the axial direction, three or more rib rows can be provided. As this occurs, at least rib rows which lie adjacent to each other may only have to be offset from each other in the circumferential direction, and rib rows which are disposed spaced apart in the axial direction may be provided in the same phase in the circumferential direction.

In addition, the resin pulley 10 of the invention is described as having the rolling bearing 11 mounted in the inner circumferential surface of the inner cylindrical portion 21, a configuration may be adopted in which a boss portion is formed on the inner circumferential side of the inner cylindrical portion 21, so that the boss portion is fixed directly to the rotational shaft.

What is claimed is:

1. A resin pulley comprising:
    an outer cylindrical portion including an outer circumferential surface on which a belt is to be wound;
    an inner cylindrical portion which is disposed radially inwards of and concentrically with the outer cylindrical portion; and
    a plurality of ribs connecting an inner circumferential surface of the outer cylindrical portion and an outer circumferential surface of the inner cylindrical portion,
    wherein the outer cylindrical portion, the inner cylindrical portion and the ribs are formed integrally from a resin material,
    wherein the ribs are provided so as to be inclined towards a circumferential direction relative to a radial imaginary line as viewed in an axial direction, and
    wherein radially outer end portions of the ribs are formed such that inclination angles of the respective radially outer end portions relative to the radial imaginary line are greater than inclination angles of respective radially intermediate portions of the ribs relative to the radial imaginary line, and radially inner end portions of the ribs are formed such that inclination angles of the respective radially inner end portions relative to the radial imaginary line are greater than the inclination angles of the respective radially intermediate portions of the ribs relative to the radial imaginary line.

2. The resin pulley according to claim 1, wherein hollow hole portions are formed between adjacent ribs of the plurality of ribs so as to penetrate through the resin pulley in the axial direction.

3. The resin pulley according to claim 2, wherein the adjacent ribs are disposed so as to be inclined towards opposite directions to each other.

4. The resin pulley according to claim 2, wherein the radially outer end portions of the ribs are formed such that inclination angles of the respective radially outer end portions relative to the radial imaginary line increase as the ribs extend radially outward, and the radially inner end portions of the ribs are formed such that inclination angles of the respective radially inner end portions relative to the radial imaginary line increase as the ribs extend radially inward.

5. The resin pulley according to claim 1, wherein adjacent ribs of the plurality of ribs are disposed so as to be inclined towards opposite directions to each other.

6. The resin pulley according to claim 5, wherein the radially outer end portions of the ribs are formed such that inclination angles of the respective radially outer end portions relative to the radial imaginary line increase as the ribs extend radially outward, and the radially inner end portions of the ribs are formed such that inclination angles of the respective radially inner end portions relative to the radial imaginary line increase as the ribs extend radially inward.

7. The resin pulley according to claim 1, wherein a plurality of rib rows, each of which contains the ribs aligned in the circumferential direction, are provided in the axial direction,
wherein the plurality of rib rows have a same external shape as viewed in the axial direction, and
wherein at least the rib rows which lie adjacent in the axial direction are disposed such that phases of the ribs are offset from each other in the circumferential direction.

8. The resin pulley according to claim 1, wherein hollow hole portions are formed between the adjacent ribs so as to penetrate through an entirety of the resin pulley in the axial direction.

9. The resin pulley according to claim 1, wherein the resin material comprises an elastomer.

10. A resin pulley comprising:
an outer cylindrical portion including an outer circumferential surface on which a belt is to be wound;
an inner cylindrical portion which is disposed radially inwards of and concentrically with the outer cylindrical portion; and
a plurality of ribs connecting an inner circumferential surface of the outer cylindrical portion and an outer circumferential surface of the inner cylindrical portion,
wherein the outer cylindrical portion, the inner cylindrical portion and the ribs are formed integrally from a resin material,
wherein the ribs are provided so as to be inclined towards a circumferential direction relative to a radial imaginary line as viewed in an axial direction, and
wherein hollow hole portions are formed between adjacent ribs of the plurality of ribs so as to penetrate through an entirety of the resin pulley in the axial direction.

11. The resin pulley according to claim 10, wherein radially outer end portions of the ribs are formed such that inclination angles of the respective radially outer end portions relative to the radial imaginary line increase as the ribs extend radially outward, and radially inner end portions of the ribs are formed such that inclination angles of the respective radially inner end portions relative to the radial imaginary line increase as the ribs extend radially inward.

12. The resin pulley according to claim 10, wherein the adjacent ribs are disposed so as to be inclined towards opposite directions to each other.

* * * * *